United States Patent
Billig et al.

(10) Patent No.: US 7,525,296 B2
(45) Date of Patent: Apr. 28, 2009

(54) SPREAD SPECTRUM POWER CONVERTER WITH DUTY-CYCLE ERROR COMPENSATION

(75) Inventors: Richard R. Billig, Los Gatos, CA (US); David J. Schanin, Denver, CO (US)

(73) Assignee: Bayview Ventures, Inc., Denver, CO (US)

( * ) Notice: Subject to any disclaimer, the term of this patent is extended or adjusted under 35 U.S.C. 154(b) by 239 days.

(21) Appl. No.: 11/506,627

(22) Filed: Aug. 18, 2006

(65) Prior Publication Data

US 2008/0043502 A1    Feb. 21, 2008

(51) Int. Cl.
G05F 1/56    (2006.01)
(52) U.S. Cl. .......................... 323/285; 323/283; 363/71; 363/16
(58) Field of Classification Search .............. 363/21.05, 363/21.11, 28, 79, 41, 71, 16, 17, 124, 80; 323/222, 207, 266, 282–285, 224, 225; 327/106, 327/107, 536, 175, 363; 290/483, 40 C
See application file for complete search history.

(56) References Cited

U.S. PATENT DOCUMENTS

| | | | |
|---|---|---|---|
| 5,260,548 A * | 11/1993 | Todd et al. .................. | 219/483 |
| 5,285,368 A * | 2/1994 | Ishikawa .................. | 363/21.05 |
| 5,594,324 A | 1/1997 | Canter et al. ................. | 323/282 |
| 6,236,275 B1 * | 5/2001 | Dent .......................... | 331/1 A |

OTHER PUBLICATIONS

Angel V. Peterchev et al., "Quantization Resolution and Limit Cycling In Digitally Controlled PWM Converters", IEEE Transactions on Power Electronics, vol. 18, No. 1, Jan. 2003, pp. 301-308.

* cited by examiner

*Primary Examiner*—Rajnikant B Patel
(74) *Attorney, Agent, or Firm*—Clifton L. Anderson

(57) ABSTRACT

A spread-spectrum power converter uses an inter-cycle duty-cycle error compensation to achieve a combination of high-precision tracking of a target average duty cycle and a favorable noise signature. The pulse train consists of a series of cycles having cycle durations of a positive integer of clock cycles, pulse durations of a whole number of clock cycles, and duty cycles corresponding to a ratio of pulse durations over cycle durations. The pulse durations are selected at least in part as functions of a target average duty cycle, the respective cycle durations, and a ripple (or other) error from other cycles in the train. The cycle durations can also be in part a function of the target average duty cycle so that the duty cycle errors can be minimized.

25 Claims, 2 Drawing Sheets

SPREAD SPECTRUM POWER CONVERTER WITH DUTY-CYCLE ERROR COMPENSATION

BACKGROUND OF THE INVENTION

The present invention relates to electrical devices and, more particularly, to power converters. A major objective of the present invention is to provide a high-precision spread-spectrum power converter. Herein, related art labeled "prior art" is admitted prior art; related art not labeled "prior art" is not admitted prior art.

There are many applications for power converters that require high precision control of a fixed output voltage. These are often traditional power supply applications, well know to those familiar with prior art. However, recent technology requirements have evolved requiring high precision control of variable output power converters, and more recently digitally controlled variable output power converters. When a digital control requirement is combined with a requirement for a variable output power controller, many limitations of prior art become evident. The present invention addresses these limitations with a novel control method.

One application for high precision, digitally controlled variable output power converters is in the field of lighting control. Precise control of voltages supplied to luminaires to achieve repeatable light output levels is a requirement in most architectural and theatrical lighting installations. Additionally, since in such applications the lighting levels are often computer controlled, these power converters need to be digitally controlled. However, the application of a digital control system to such an application has significant limitations. Key among these is the implicit nature of a digital control system to step from one value to the next. Lighting control applications require smooth transitions from one light level to the next and hence complex and costly schemes have been developed to eliminate these "steps" and achieve smooth transitions between light levels, and to prevent damage to some light sources.

Prior art power conversion for lighting applications with digital control has gone through several generations of technology. Initial prior art focus was on delivering reduced portions of the input AC line voltage waveform to the load, this being accomplished through the use of moderate speed switches which could connect and disconnect the line to load at 100 or 120 times a second (each half of a 50 or 60 Hz line cycle). This technique is referred to as phase control. While simple and robust, this solution created destructive input power line harmonics, which are presently being prohibited through regulations. In addition, such "chopping" of the input, and hence output, waveforms create sympathetic vibrations ("lamp sing") in incandescent lamp filaments at frequencies considered annoying to human hearing.

More recent prior art addresses phase control limitations by alternately coupling and decoupling an input voltage to an output many times per voltage half-cycle, rather than just once. The resulting chopped waveform can be re-integrated to provide a smooth output waveform of voltage reduced as a function of a chopper switch duty cycle. To provide for dimming and precise voltage adjustments, a pulse-width modulator can provide pulse trains with variable duty cycles to control the chopper switch. While analog pulse-width modulators are known, digital pulse-width modulators provide precise control over duty cycles more economically.

One problem with digital pulse-width modulators is that duration values change in discrete steps so that durations between steps are not available. For example, consider a counter driven by a one-megahertz (1 MHz) clock signal. Fifty counts yields a 50-microsecond duration, and fifty-one counts yields a 51-microsecond duration. A 50.5 microsecond duration is not available.

One approach to achieving an intermediate duration is to increase the clock speed. For example, if a 2 MHz clock is used, counting to 101 provides a 50.5 microsecond duration. However, other intermediate values, such as 50.25 are not available without doubling the clock frequency again. Depending on the application and technology, increasing clock speeds becomes cost-prohibitive because many circuit components must be upgraded to minimize parasitic capacitances and inductances to handle higher frequencies. Also, the bit length of counters may have to be increased to maintain the same range for available durations. The economical limit to the clock frequency and counter width is generally dictated by the specifications of cost-effective commercially available microcontroller designs.

If a higher clock frequency is not available, intermediate values can still be achieved on a time-averaged basis. For example, alternating between 50 and 51 counts can provide a time-averaged duration of 50.5 counts. For another example, a pattern such as 50, 50, 51, can achieve a time-averaged duration of 50.33 counts. In principle any intermediate value can be approached with any precision over enough cycles on a time-averaged basis. This approach, in which two consecutive counts (e.g., 50 and 51) are alternated to achieve an intermediate value on a time-averaged basis, is called "dithering" herein.

Another problem with digital power converters is that they generate electrical noise at the switching frequency. For example, cycling a chopper switch at 50 microsecond cycles yields noise in the 20 kHz region and at many higher harmonic frequencies. As this noise may interfere with the operation of other devices and exceed levels permitted by government regulations, it may need to be filtered out. A filter designed to remove this noise to comply with governmental regulations, when all the noise energy is concentrated at a single frequency, can add considerable expense to a power converter.

This electrical noise problem can be made more manageable by varying the switch cycle duration from cycle to cycle. This spreads the noise spectrum so that the peak energy delivering the electrical noise at any one frequency is lower. This makes filtering it less expensive The problems of limited precision in output voltage and an unfavorable noise signature can be addressed separately as described above. What is needed is an approach to power conversion that can achieve high precision output control while also achieving a favorable noise signature of a spread-spectrum power converter.

SUMMARY OF THE INVENTION

The present invention provides a spread-spectrum power converter that uses duty-cycle error compensation between pulse-train cycles of disjunct durations. A pulse-train generator generates a pulse train consisting of a sequence of pulse cycles, each having a cycle duration corresponding to a positive integer number of clock cycles, each having a pulse duration corresponding to a whole number of clock cycles, and each having a duty cycle corresponding to the ratio of its pulse duration over its cycle duration. In general, the duty cycle for a pulse cycle will not match the target average duty cycle; the difference is a duty-cycle error. The duty cycle error can be compensated in other duty cycles, for example, by selecting a pulse duration for another cycle that deviates in an opposite direction. The present invention requires that at least some of these compensations are between cycles of disjunct durations, i.e., durations that differ by more than the minimum by which the durations can differ, e.g., one clocked count.

For example, a pulse train can sequence through a series of different cycle durations, e.g., chosen to provide a favorable noise signature. For each cycle other than the first, the pulse duration can be chosen as a function of the target average duty cycle, the respective cycle duration, and error accumulated from one or more prior cycles, e.g., to minimize the expected accumulator error by the end of the current pulse train sequence.

Duty cycle errors can be compensated between pulse-train cycles. If the duration of the present compensating duty cycle differs by more than one dock count from the duration of one of the cycles from which error was accumulated, the error compensation is between pulse-train cycles of disjunct durations. The use of "disjunct" in this context is analogous to its use in music: a "disjunct" melody is one in which successive notes differ by more than a second interval, which is the minimum interval in a scale.

In this semantic context, "dithering" can be understood as error compensation between cycles of non-disjunct durations. For example, dithering can involve alternating between cycles of the same duration with pulses differing by one clock count, e.g., alternating 50/100 and 51/100. Or, dithering can involve alternating between cycles of durations that differ by one clock count, e.g., alternating between 50/100 and 50/101.

The present invention recognizes that duty-cycle error compensation can be effected between the very different cycle durations that can occur in a spread-spectrum pulse train. While it does not preclude some use of dithering, the present invention does recognize that dithering is not necessary to achieve greater than nominal precision on a time-averaged basis in a spread-spectrum power converter. Thus, there is no need to compromise an ideal pulse train for noise signature purposes to permit dithering. Instead, the present invention allows the pulse train to be optimized for a desired noise signature.

The present invention provides for further enhancements to minimize the magnitudes of the duty-cycle errors that must be compensated. For example, instead of sequencing through a fixed set of cycle durations, cycle durations can be chosen to minimize duty cycle errors. For example, if the target average duty cycle is 50%, then an even cycle duration can be selected to avoid accumulating error. If there is accumulated error to compensate, an even or odd cycle duration can be selected depending on which achieves more effective compensation. By minimizing the magnitude of duty-cycle errors, noise can be further reduced. These and other features and advantages of the invention are apparent from the description below with reference to the following drawings.

DETAILED DESCRIPTION

Figure 1:
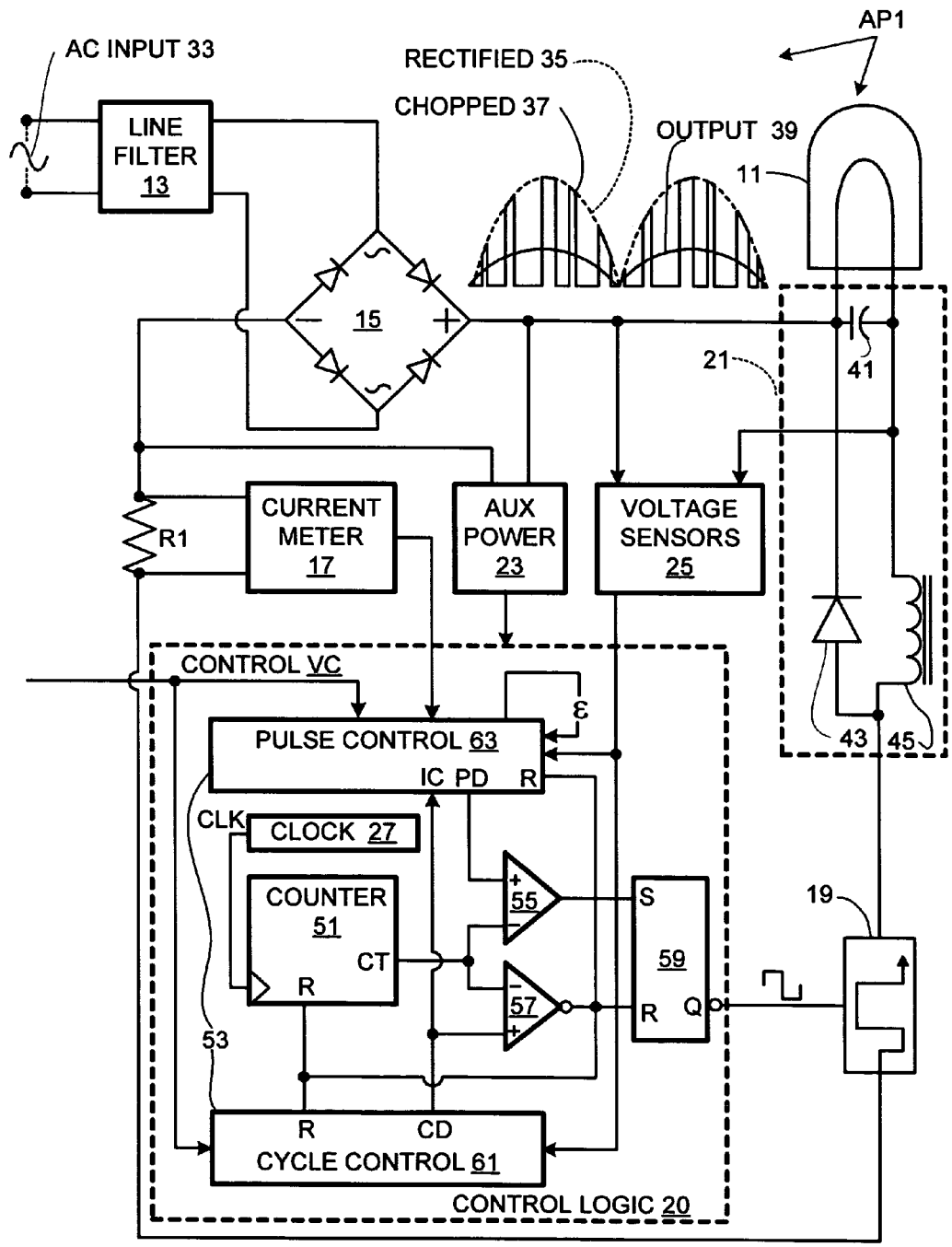
FIG. 1 is a circuit diagram of a power converter in accordance with the present invention.
Figure 2:
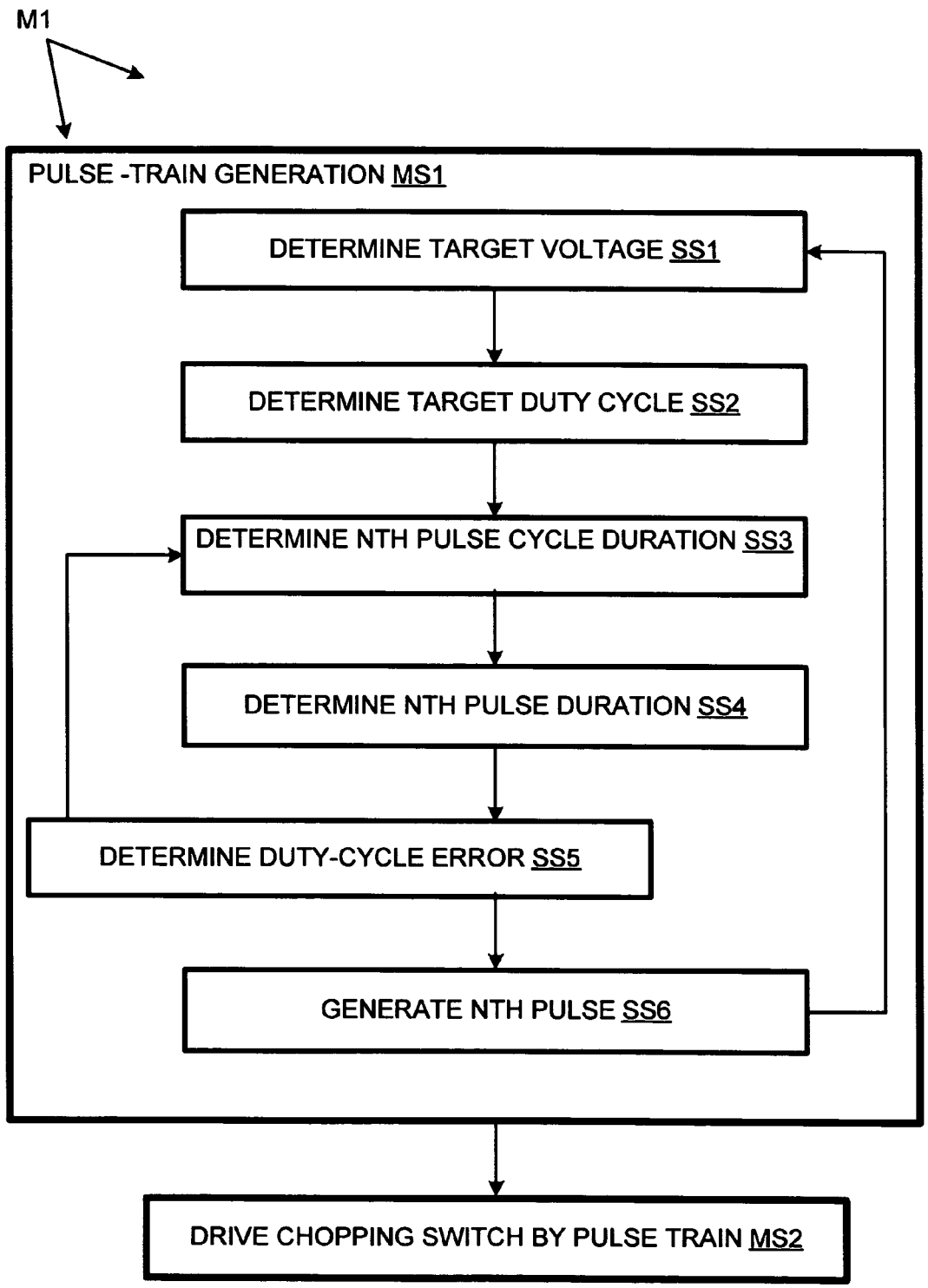
FIG. 2 is a flow chart of a power converter method in accordance with the present invention.

A spread-spectrum, frequency-hopping, power converter AP1, in accordance with the present invention, rectifies an input AC waveform, chops the rectified waveform, and integrates the chopped waveform to yield a periodic DC voltage waveform, which is used to drive an incandescent lamp 11, as shown in FIG. 1. The amplitude of the DC voltage waveform is controlled in response to a voltage control signal VC. This voltage control signal can be set manually, as with a dimmer control, or be based on feedback in a self-regulated system.

Power converter AP1 is implemented in an AT90PWM2 8-bit microcontroller (available from Atmel Corporation, San Jose, Calif.), which has built-in pulse-width modulation capability. Alternatively, another microcontroller with PWM capability or an external peripheral with PWM capability can be used. For explanatory purposes, power converter AP1 is described in terms of discrete components.

As shown in FIG. 1, power converter AP1 comprises an line filter 13, a bridge rectifier 15, a sense resistor R1, a current meter 17, a chopper switch 19, control logic 20, an integrator 21, an auxiliary power supply 23, voltage sensors 25, and a clock source 27. Line filter 13 attenuates any switching artifacts that might otherwise propagate back onto the input AC mains. AC waveform 33 is rectified by bridge rectifier 15 to yield a rectified waveform 35. Rectified waveform 35 is chopped by chopper switch 19 to yield a chopped waveform 37. Note that if an AC output is desired, a rectifier is not needed. Chopped waveform 37 is smoothed by integrator 21 to yield output waveform 39.

Integrator 21 includes a capacitor 41 in series with an inductor 43. A flyback diode 45 is connected in parallel with capacitor 41 and inductor 43. This diode allows for discharge of the inductor when chopper switch 19 is open, recirculating its discharge current through load 11 for efficiency. Note that lamp load 11 or other load may also contribute to smoothing.

The output voltage associated with output waveform 39 is determined by the input voltage associated with input AC waveform 31 and the average duty cycle for chopper switch 19. The average duty cycle for chopper switch 19 is controlled by control logic 20 in response to voltage control signal VC and voltage data from voltage sensors 25. Voltage sensors 25 measure the voltages of rectified input waveform 35 and output waveform 39; voltage sensors 25 provide to control logic 20 data representing the rectified input voltage and the difference between the rectified input voltage and the output voltage to control logic 20. This latter difference corresponds to the voltage across the inputs of lamp 11. The rectified input voltage is used by control logic to estimate the average duty cycle needed to obtain the set target output voltage. The voltage across the load inputs is used for closed loop operation. Alternatively, the invention provides for open loop operation, in which case the output voltage need not be fed back, and/or for omitting an input voltage sensor and operating on the assumption that the input voltage is well regulated.

Control logic 20 includes a 12-bit up-counter 51, pulse train controller 53, comparators 55 and 57, and an SR flip-flop 59. Comparator 55 yields a high output when the value at the minus input exceeds the value at the plus input; when the inputs are equal, the output is low. Comparator 57 is similar except that its output is inverted. Pulse-train controller 53 includes a cycle duration controller 61 and a pulse duration controller 63. Cycle duration controller 61 sets the cycle duration in terms of a cycle duration count CD of clock cycles of clock waveform CLK. Pulse controller 53 sets a pulse duration in terms of a pulse duration count PD of dock cycles.

The output count CT of counter 51 is provided to the minus inputs of comparators 55 and 57. Upon counter reset to zero (CT=0), the inverted output of comparator 57 is low, since its plus input is held at a positive cycle duration count CD and its minus input is at zero. Upon counter reset, the output of comparator 55 is high if the pulse duration count PD is non-zero.

While the output of comparator 55 is high, flip flop 59 is "set" and its output Q is high. As long as output Q is high, chopper switch 19 is "on". When count CT reaches pulse duration threshold PD, the output of comparator 55 goes low, but this does not immediately change the output Q of flip flop 59, so chopper switch 19 remains on.

When count CT crosses cycle duration threshold CD, the inverted output of comparator 57 goes high, resetting flip-flop 59 so that output Q goes low. This turns off chopper switch 19, decoupling input 31 from output 39. Also, when the inverted output of comparator 57 goes high, counter 51, cycle control 61, and pulse control 63 are reset. Thus, the count CT returns to zero, cycle control 61 outputs the next cycle duration threshold CD, and pulse control 63 outputs the next pulse duration threshold PD. Since the count returns to zero, the inverted output of comparator 57 resumes its normally low state. In the case that pulse duration threshold PD is zero, comparator 55 never goes high, flip flop 59 is not set, and chopper switch 19 remains off for the entire cycle.

The cycle duration threshold CD of cycle control 61 is coupled to an input IC of pulse control 63. Pulse control 63 ensures that pulse count threshold PD never equals or exceeds cycle count threshold CD. The duty cycle for a cycle is given by the fraction PD/CD, where PD and CD are integers and $0 \leq PD < CD \leq 4095$. The present invention allows CD to vary greatly enhancing precision relative to a system using a fixed CD. For a pedagogical example, if CD=4, then the possible duty cycles are 0/4, 1/4, 1/2, and 3/4. However, if CD can equal 3 or 4, the possible duty cycles are 0, 1/4, 1/3, 1/2, 2/3, and 3/4. For many possible target duty cycles, the additional two values allow a closer approximation. The approximations can improve in practice when there are more cycle duration thresholds to choose from.

In one mode for control logic 20, cycle control 61 repeatedly sequences through a fixed set of cycle duration counts. For example, the pulse train can cycle through a vector of sixteen cycle duration thresholds, such as in the following Table I:

TABLE I

Cycle Duration Vector

| Vector Position | Cycle Count | Ratio to Lowest f |
|---|---|---|
| 1 | 499 | 1.116 |
| 2 | 520 | 1.071 |
| 3 | 479 | 1.163 |
| 4 | 504 | 1.105 |
| 5 | 550 | 1.013 |
| 6 | 515 | 1.082 |
| 7 | 484 | 1.151 |
| 8 | 532 | 1.047 |
| 9 | 494 | 1.128 |
| 10 | 526 | 1.059 |
| 11 | 474 | 1.175 |
| 12 | 538 | 1.035 |
| 13 | 509 | 1.094 |
| 14 | 544 | 1.024 |
| 15 | 489 | 1.139 |
| 16 | 557 | 1.000 |

Note that the cycle duration threshold of 557 corresponds to the longest duration and, therefore, the lowest frequency. The remaining cycle duration counts correspond to evenly spaced frequencies from the lowest frequency. The result is an evenly spread pulse-train spectrum, which provides a favorable noise signature, i.e., one that can readily be brought within acceptable noise limits.

The cycle duration threshold is 499 dock cycles for the first and every $16^{th}$ pulse thereafter within the pulse train. For the first pulse cycle, pulse control 63 chooses the pulse duration threshold CD that yields a duty cycle as close as possible to that called for by voltage control input VC. However, due to the quantized nature of the available pulse durations, there will usually be some error $\epsilon$.

In the second cycle, the cycle duration is 520. Pulse control 63 then chooses a pulse duration threshold CD so that the average of the first two thresholds matches the target duty cycle as closely as possible. This means that the error $\epsilon$ from the first cycle is a factor in determining the pulse duration threshold for the second cycle. More generally, pulse control 63 chooses each pulse duration threshold CD so that the time-averaged duty cycle for the pulse train matches the target duty cycle as closely as possible. Since this generally involves compensating for errors in prior cycles, this process is referred to as "ripple error compensation". This ripple error compensation allows the precision with which a target duty cycle is achieved to exceed the nominal precision of counter 51, obviating the need for dithering used for this purpose in nominally fixed frequency systems.

The present invention allows pulse-duration thresholds other than the one that provides the best match by the end of its pertinent cycle. In some cases, a larger error may permit more precise compensation in future cycles due to the quantized nature of the cycles. Also, the switching characteristics for the chopper switch can place limitations on the minimum non-zero duration for a pulse. For example, switch 19 cannot turn fully on or off in one dock cycle. Therefore, when a one-clock cycle pulse nominally would most closely approximate a target duty cycle, pulse control 63 can output a zero pulse duration threshold. Likewise, when the pulse duration that would nominally most closely approximate a target duty cycle is one less than a 100% duty cycle, one or more 100% duty cycles can be used, with the resulting errors compensated in other cycles. The error is rippled forward and accumulated, if necessary, over the following cycles. When the accumulated error is sufficient to call for a pulse duration that is within the slew-rate capabilities of switch 19, a non-zero pulse duration can be used to compensate for the accumulated errors.

In general, however, a smaller ripple error is preferred to minimize noise. To this end, control logic 20 provides a mode in which each vector position permits a selection of three or more possible adjacent values. Thus, in the first vector position, any cycle duration count from 496 to 502 can be selected (instead of being fixed at 499). Cycle control 61 picks the threshold within this range that provides for the best match between the cycle's duty cycle and the target average duty cycle. Pulse control 63 then determines a pulse duration count as a function of the target threshold set by voltage control signal VC, voltage data from voltage sensors 25, the selected cycle duration threshold, and the accumulated ripple error.

Ripple error compensation is a type of intercycle error compensation in which errors are accumulated chronologically. The present invention provides for other types of intercycle duty-cycle error compensation. For example, where an error is expected in a subsequent pulse cycle, e.g., because a low cycle durations limits the precision available by choosing pulse durations, a previous pulse cycle can precompensate for the expected error.

The present invention provides for more sophisticated modes of operation in which the order in which cycle duration values are picked is not fixed, but optimized to minimize ripple error while maintaining a favorable noise signature. Note that if the desired noise signature is not uniform, the pulse train generator can accommodate by adjusting the basis for selecting cycle and pulse durations. The present invention provides for other approaches to optimizing the pulse train. For example, hop through a sequence of cycle duration ranges, and picking from each range a count that minimizes ripple error, 1) in that it allows the target duty cycle to be matched closely, 2) in that it best compensates for pre-existing ripple error, or 3) in that it allows ripple error to be minimized in the fewest cycles, e.g., it minimizes average ripple-error magnitudes. For example, one might prefer a larger ripple error that is easier to cancel in the next cycle.

In another variation, the sequence of ranges is not fixed, but is optimized according to some criterion. For example, ripple error can be considered first for all possible cycle times and then noise signature (or spectrum spread) can be used to pick among the best candidates. These and other variations upon and modifications to the illustrated embodiment is provided for by the present invention, the scope of which is defined by the following claims.

What is claimed is:

1. A power converter comprising:
   a pulse-train generator for generating a pulse train consisting of a series of pulse cycles, each of said pulse cycles having a cycle duration that is a positive integer number of clocked counts, each of said pulse cycles having a pulse duration that is a whole number of said counts, each of said pulse cycles having a duty cycle corresponding to the ratio of its pulse duration to its cycle duration, said pulse generator determining the duty cycle of at least a first pulse cycle as at least a partial function of an error between a duty cycle of a second pulse cycle in said pulse train and a target average duty cycle, wherein the cycle durations of said first and second pulse cycles differ by more than one clocked count; and
   a chopper switch driven by said pulse train so as to alternately couple and decouple an input voltage waveform to and from an output.

2. A power converter as recited in claim 1 wherein said second pulse cycle has a second cycle duration and a zero duty cycle, said target average duty cycle being greater than that of a pulse cycle with a said second cycle duration and a pulse duration of one clocked count.

3. A power converter as recited in claim 1 wherein said second pulse cycle has a second cycle duration and a 100% duty cycle, said target average duty cycle being less that of a pulse cycle with said second cycle duration and a pulse duration one clocked count less than said second cycle duration.

4. A power converter method comprising:
   generating a pulse-train consisting of a series of pulse cycles, each of said pulse cycles having a cycle duration that is a positive integer number of docked counts, each of said pulse cycles having a pulse duration that is a whole number of said counts, each of said pulse cycles having a duty cycle corresponding to the ratio of its pulse duration to its cycle duration, said pulse generator determining the duty cycle of at least a first pulse cycle as at least a partial function of an error between a duty cycle of a second pulse cycle in said pulse train and a target average duty cycle, wherein the cycle durations of said first and second pulse cycles differ by more than one clocked count; and
   alternately coupling and decoupling an input voltage waveform to and from an output under control of said pulse train.

5. A method as recited in claim 4 wherein said second pulse cycle has a second cycle duration and a zero duty cycle, said target average duty cycle being greater than that of a pulse cycle with a said second cycle duration and a pulse duration of one clocked count.

6. A method as recited in claim 4 wherein said second pulse cycle has a second cycle duration and a 100% duty cycle, said target average duty cycle being less that of a pulse cycle with said second cycle duration and a pulse duration one clocked count less than said second cycle duration.

7. A power converter comprising:
   a pulse-train generator for generating a frequency-hopping pulse train having multiple frequency bands and with ripple duty-cycle error compensation between pulses from disjunct ones of said frequency bands; and
   a chopper switch for coupling and decoupling an input voltage waveform to and from an output in response to said pulse train.

8. A power converter as recited in claim 7 wherein said pulse train comprises a series of cycles characterized by respective repeating sequence of cycle durations selected from non-overlapping ranges of durations.

9. A power converter as recited in claim 8 wherein said pulse train comprises a series of cycles characterized by a respective repeating sequence of different cycle durations.

10. A power converter as recited in claim 8 wherein each of said cycle durations is a positive integer number of clock cycles, each of said cycles having a pulse duration that is a whole number of said clock cycles.

11. A power converter as recited in claim 10 where each said whole number is selected in part as a function of a target average duty cycle.

12. A power converter as recited in claim 10 wherein each said cycle duration is selected in part as a function of said target average duty cycle.

13. A power converter method comprising:
   a frequency-hopping pulse train having multiple frequency bands and with ripple duty-cycle error compensation between pulses from disjunct ones of said frequency bands; and
   chopping a voltage waveform using a switch driven by said pulse train.

14. A method as recited in claim 13 wherein said pulse train includes some zero duty cycle pulses corresponding to a highest one of said frequency bands and only non-zero duty cycle pulses corresponding to a lowest one of said frequency bands.

15. A method as recited in claim 13 wherein said pulse train includes some 100% duty cycle pulses corresponding to a highest one of said frequency bands and only non-zero duty cycle pulses corresponding to a lowest one of said frequency band.

16. A power converter comprising:
   a voltage input for receiving an input voltage waveform;
   a control input for receiving a control input;
   a voltage output for outputting an output voltage waveform having variable voltage-related parameter having an output-voltage value;
   a pulse generator for generating pulses each of which has a pulse duration and a cycle duration selected from a finite set of discrete durations, each of said pulses having a duty cycle that is a function of its pulse duration and its cycle duration;
   a controller responsive to said control input for causing said pulse generator to generate a series of pulses of at least three different durations, said pulses having an average duty cycle that is at least a partial function of said control input, said output-voltage value being at least a partial function of said average duty cycle;

a switch for chopping said input voltage waveform under control of said series of pulses to yield a chopped waveform; and a filtering circuit for converting said chopped waveform into said output voltage waveform.

17. A power converter as recited in claim 16 wherein, in said series, for each of the at least three cycle durations represented in said series there are two pulses having that duration that are separated by at least two pulses of two or more different durations.

18. A power converter as recited in claim 16 wherein for each pulse of said series, its pulse duration is within a rounding error of the product of said average duty cycle and the pulse's cycle duration.

19. A power converter as recited in claim 16 wherein for some input and output voltage value pairs, some of said pulses have zero pulse durations and non-zero cycle durations.

20. A power converter as recited in claim 16 wherein for some of said pulses of said series, their pulse durations are determined as a function of an error value resulting at least in part from a calculation of the pulse duration for another pulse in said series.

21. A power converter as recited in claim 16 wherein each of said pulse durations has an associated frequency that is inversely related to that cycle duration, said durations being picked so that the maximum frequency difference between adjacent frequencies is no more than twice the minimum frequency difference between adjacent frequencies.

22. A power converter as recited in claim 16 wherein said at least three different durations occur in a fixed sequence throughout said series.

23. A power converter as recited in claim 16 wherein said fixed sequence remains unchanged over at least most of the available range for said output voltage values.

24. A power converter as recited in claim 16 wherein none of said durations characterizes more than one-half of the pulses in said series.

25. A power converter as recited in claim 16 wherein none of said durations characterizes more than 20% of the pulses in said series.

* * * * *